June 30, 1925.
E. H. BELDEN
1,543,820
AUTOMOBILE FRAME
Filed Feb. 26, 1921
3 Sheets-Sheet 1
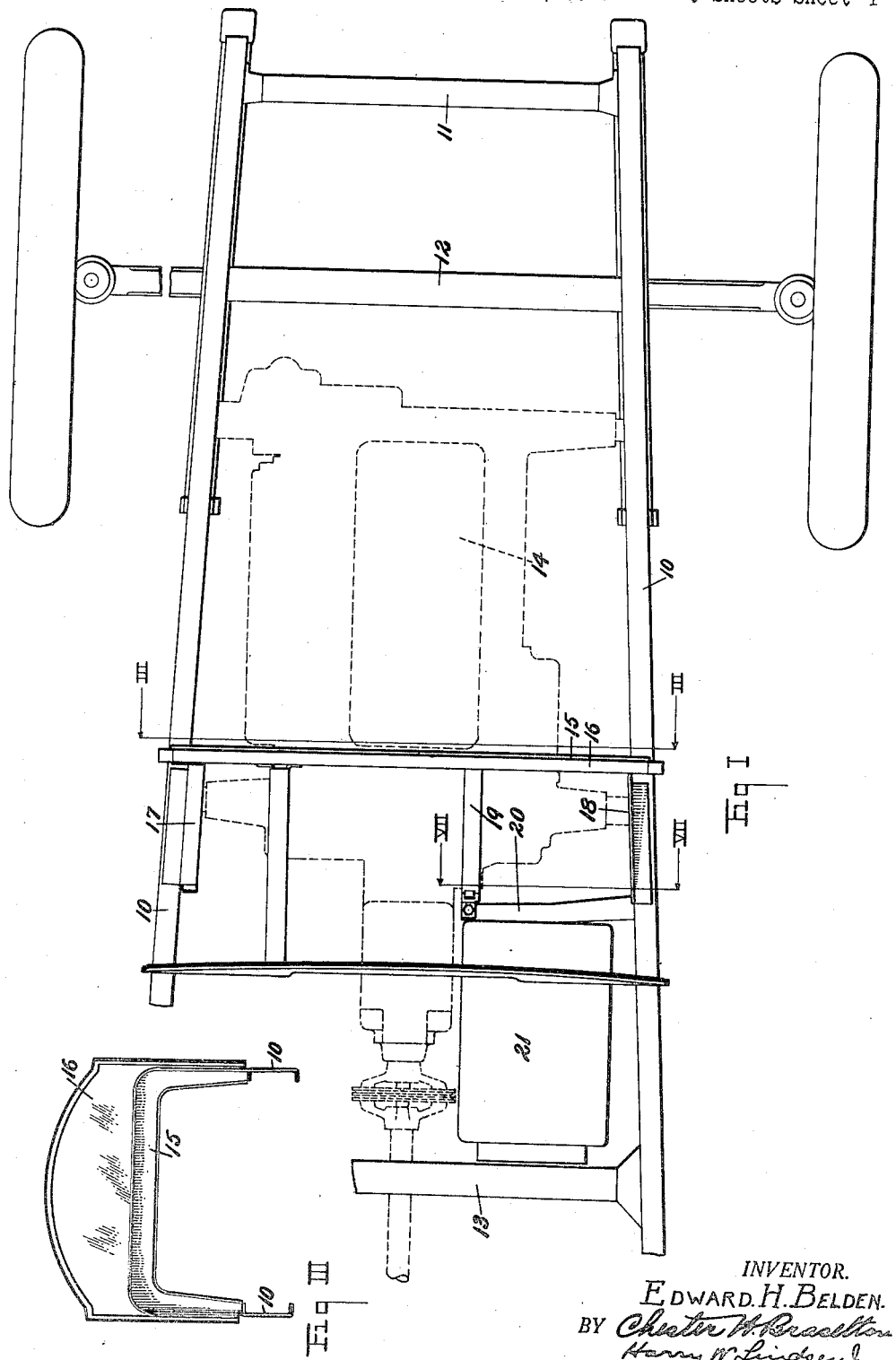
INVENTOR.
EDWARD. H. BELDEN.
BY
ATTORNEYS.

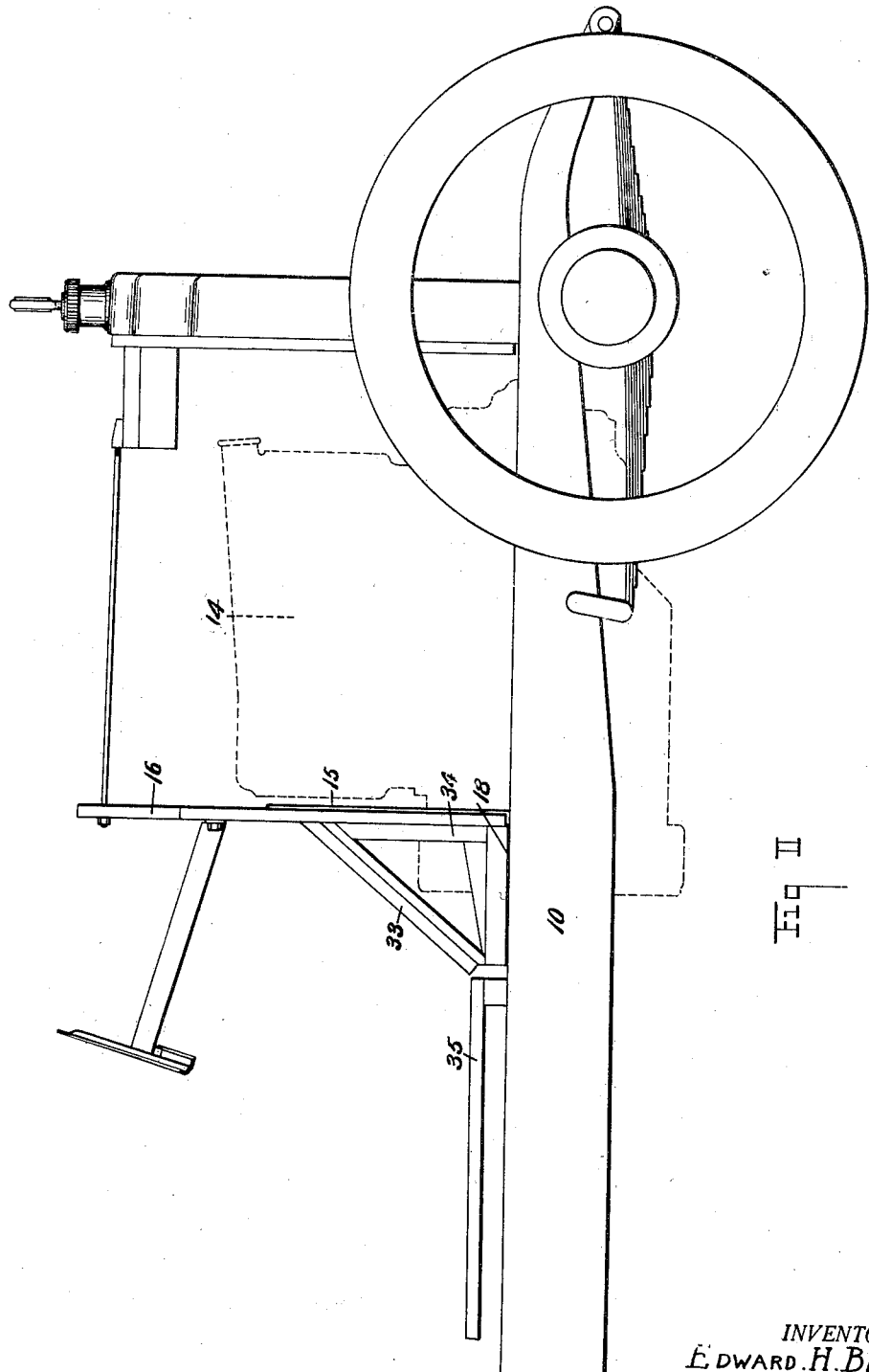

June 30, 1925.
E. H. BELDEN
AUTOMOBILE FRAME
Filed Feb. 26, 1921   3 Sheets-Sheet 3
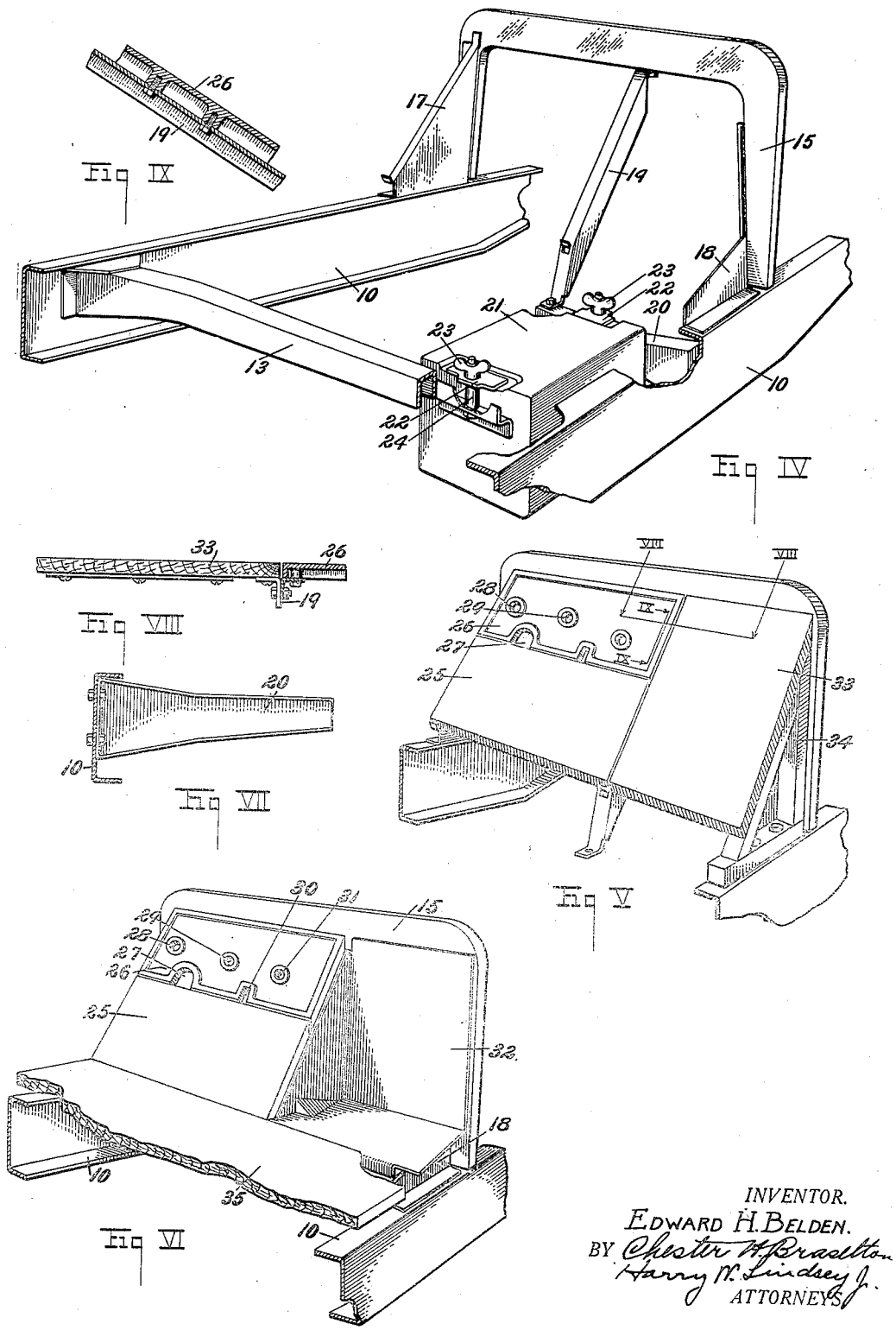
INVENTOR.
EDWARD H. BELDEN.
BY Chester H. Braelton
Harry W. Lindsey Jr.
ATTORNEYS Patented June 30, 1925.

1,543,820

UNITED STATES PATENT OFFICE.

EDWARD HALE BELDEN, OF TOLEDO, OHIO, ASSIGNOR TO THE WILLYS-OVERLAND COMPANY, OF TOLEDO, OHIO, A CORPORATION OF OHIO.

AUTOMOBILE FRAME.

Application filed February 26, 1921. Serial No. 448,019.

*To all whom it may concern:*

Be it known that I, EDWARD H. BELDEN, residing at Toledo, in the county of Lucas, State of Ohio, have invented certain new and useful Improvements in Automobile Frames, of which I declare the following to be a full, clear, and exact description.

This invention relates to improvements in automobile frames and has reference in particular to the toe board supports and the supporting means for the battery box.

An object of the invention is the provision of supporting means adapted to receive either a complete toe board extending entirely across the car or one extending but part way across the car, whereby, with a single chassis, a coupé body having a space alongside the toe board for the reception of a swinging, folding seat may be employed as well as touring and sedan bodies in which the toe board extends entirely across the car.

Another object is the provision in connection with the toe board supporting means as above characterized, of means for supporting a battery box or other receptacle.

Other objects, and objects relating to details of construction and economies of manufacture, will appear as I proceed with the description of that embodiment of the invention which, for the purposes of the present application I have illustrated in the accompanying drawings, in which:

Figure I is a more or less diagrammatic plan view of the forward portion of an automobile chassis embodying my invention, the position of the engine and a portion of the transmission mechanism being indicated by dotted lines.

Figure II is a side elevation with the hood removed.

Figure III is an elevational view, partly in section on the line III—III of Figure I.

Figure IV is a fragmentary section of a portion of an automobile chassis, parts of the frame being broken away to more clearly illustrate the invention.

Figure V is a perspective view of a complete toe board supported in accordance with my invention.

Figure VI is a similar view, showing one section of the toe board omitted in order to accommodate the swinging seat of a coupé body.

Figure VII is a view in section on the line VII—VII of Figure I, showing a supporting arm extending horizontally inward from a side rail of the frame.

Figure VIII is a view in section taken substantially on the line VIII—VIII of Figure V.

Figure IX is a vertical, sectional view taken substantially on the line IX—IX of Figure V.

Like reference characters refer to similar parts throughout the views.

In the drawings, 10 represents the side rails of an automobile frame, which are connected at their forward ends by transverse braces 11 and 12 and at a position about midway of their length by another transverse brace 13.

Directly behind the cylinder block of the engine 14, I join the two side rails 10 by the arched connecting member 15 upon which the dash 16 rests. This arched member is secured to the rails in any suitable manner. It is braced on one side by a metallic bracket 17 secured to the top of the side rail as well as to the arched member. On the other side a relatively low metallic bracket 18 is employed, this bracket also being fastened to the side rail as well as to the arched member.

I fasten to the arched member 15 intermediate its ends a metallic supporting bar 19 which is inclined at such an angle as to bring its top side into the same plane with the top of the bracket 17. The foot of the bar 19 is supported by, and attached to, the inner extremity of an arm 20 of channel shape which is securely anchored to the side rail 10 near the rear of the bracket 18. The arm 20 serves an additional purpose in my construction in that it constitutes a support for one end of a receptacle 21 which I utilize preferably as a battery box. The receptacle may have metallic plates 22 secured thereto and extending beyond the ends thereof through which extend bolts 23, which may be secured to the arm 20 and brace 13 in any suitable manner. In the present instance connection is made with the brace 13 through a spacing sleeve 24 resting upon a short length of Z bar which is secured to the brace 13 by rivets, spot welding or other fastening means.

Where the driver's seat is at the left of the car as would be the case in the machine illustrated, the control apparatus is also located entirely at the left, that is between the bracket 17 and the bar 19. Upon these two supports I mount toe board sections 25 and 26. The latter section is provided with an opening 27 for the steering post, openings 28 and 29 for the clutch and brake foot pedals, respectively, an opening 30 for the accelerator pedal and an opening 31 for the starter button. In the construction illustrated, the lower section 25 is without openings of any kind. It should be understood that this exact arrangement is not essential to my invention, as this part of the toe-board might be made in one piece instead of two pieces or the openings might be partially or altogether through the lower section where two sections are employed.

Now, when a coupé body is to be used no other toe-board section than those just described is employed, the remaining space in front of the arched member 15 being filled with a three-sided cover 32 having a floor portion which slopes upward somewhat towards the front so as to fit over the bracket 18. The space thus afforded is utilized for the storage of a small folding seat (not shown) which swings around a bracket located near the forward door post on that side of the car.

In the event that a touring body or a sedan body is to be used on a chassis of the same design, the cover element 32 is not employed, but in its stead a toe-board section 33 is employed in order to cause the toe-board to extend entirely across the car. When this is to be done a triangular bracket 34 is bolted to the top of the side rail 10 and against the arched member 15 outside of the vertical portion of the bracket 18, and the toe-board 33 is then secured to the bracket 34 and the bar 19 by any suitable means. Thus, there is produced a complete toe-board extending across the full width of the automobile, substantially of the same appearance as the ordinary toe-board.

It will be perceived therefore that by means of my invention a single chassis may be manufactured which will be adaptable without change for touring and sedan bodies in which the ordinary toe-board is employed and for coupé bodies as well where part of the toe-board must be eliminated in order to provide space for a swinging seat. Attention is also directed to the fact that the lower end of the intermediate supporting bar 19 is supported entirely from one side of the automobile frame, thus avoiding interference with the transmission mechanism as will be evident from an inspection of Figure I of the drawings, while at the same time an excellent support for the battery box is provided whereby it occupies space which is not available for other purposes in a location which is readily accessible by the simple expedient of raising the forward section of the flooring indicated by the numeral 35 in Figures II and VI.

I am aware that the particular embodiment of my invention which is herein shown and described is susceptible of considerable variation without departing from the spirit thereof, and therefore I desire to claim my invention broadly as well as specifically as indicated by the appended claims.

Having thus described my invention, what I claim as new and desire to cover by Letters Patent is:

1. In an automobile, a frame including side rails, an inclined toe-board supporting member located above one of said side rails and a second inclined toe-board supporting member located between the rails, the steering post and all control levers of the automobile being located between said inclined supporting members.

2. In an automobile, a frame including side rails, an arched connecting member between the rails and two inclined toe-board supporting members secured to said arched member, one above one of the rails and the other intermediate the rails, the steering post and all control levers being located between said inclined members.

3. In an automobile, a frame including side rails, an inclined toe-board supporting member mounted upon one of said side rails, a second inclined toe-board supporting member located between the rails and an arm secured to and extending inwardly in a transverse direction from the other rail for supporting the lower end of the second inclined member.

4. In an automobile, a frame including side rails, an inclined toe-board supporting member mounted upon one of said side rails, a second inclined toe-board supporting member located between the rails, an arm secured to and extending inwardly in a transverse direction from the other rail for supporting the lower end of the second inclined member, and a readily detachable toe-board support adapted to be mounted upon the last named rail.

5. In an automobile, a frame including side rails, an inclined toe-board supporting member mounted upon one of said side rails, a second inclined toe-board supporting member located between the rails, an arm secured to and extending inwardly in a transverse direction from the other rail for supporting the lower end of the second inclined member, a readily detachable toe-board support adapted to be mounted upon the last named rail, and a container mounted upon the frame behind said arm and partly supported thereby.

6. In an automobile, a frame including side rails, an inclined toe-board supporting member mounted upon one of said side rails, a second inclined toe board supporting member located between the rails, an arm secured to and extending inwardly in a transverse direction from the other rail for supporting the lower end of the second inclined member, a brace joining the said rails in the rear of said arm and means in connection with said brace and said arm for supporting a receptacle therebetween.

7. In an automobile, a toe-board made in two adjoining aligned parts divided longitudinally of the automobile and supported one independent of the other, all of the control apparatus extending through one of said parts, whereby the other part may be removed for the purpose of providing additional space.

8. An automobile frame comprising a toe-board built in two separate independent sections in relative alignment, one section having openings therein for control apparatus, the other section lying laterally adjacent thereto and removable.

9. In an automobile, a frame, three inclined toe-board supporting members carried by the frame, one of which is located between the sides of the frame, said inclined members being adapted to support separate toe-boards, one edge of each board resting upon the inclined member located between the sides of the frame.

10. In an automobile, a frame, separate toe-boards inclined relatively to the frame, and a plurality of inclined supporting members for the toe-boards carried by the frame, one of which forms a support for each of said boards, one of said toe-boards being readily removable.

In testimony whereof I affix my signature.

EDWARD HALE BELDEN.